(12) United States Patent
Shah (10) Patent No.: US 11,393,000 B2
(45) Date of Patent: Jul. 19, 2022

(54) NETWORKED FOOD PREPARATION AND VENDING SYSTEM

(71) Applicant: Nishant Shah, Aurora, IL (US)

(72) Inventor: Nishant Shah, Aurora, IL (US)

( * ) Notice: Subject to any disclaimer, the term of this patent is extended or adjusted under 35 U.S.C. 154(b) by 0 days.

(21) Appl. No.: 16/853,845

(22) Filed: Apr. 21, 2020

(65) Prior Publication Data

US 2021/0326948 A1 Oct. 21, 2021

(51) Int. Cl.
| | |
|---|---|
| *G06Q 30/02* | (2012.01) |
| *G07F 17/00* | (2006.01) |
| *G07F 9/00* | (2006.01) |
| *G07F 11/62* | (2006.01) |

(52) U.S. Cl.
CPC ......... *G06Q 30/0284* (2013.01); *G07F 9/002* (2020.05); *G07F 9/006* (2013.01); *G07F 11/62* (2013.01); *G07F 17/0064* (2013.01)

(58) Field of Classification Search
CPC . G06Q 30/0284; G07F 17/0064; G07F 11/62; G07F 9/002; G07F 9/006
See application file for complete search history.

(56) References Cited

U.S. PATENT DOCUMENTS

| | | | | |
|---|---|---|---|---|
| 6,021,394 | A * | 2/2000 | Takahashi | G06Q 30/0202 705/7.31 |
| 9,922,576 | B2 * | 3/2018 | Holman | G07F 17/0078 |
| 10,019,865 | B2 * | 7/2018 | Torresani | G06N 20/00 |
| 10,134,218 | B2 * | 11/2018 | Torresani | G07F 9/002 |
| 10,275,975 | B2 * | 4/2019 | High | G01C 21/362 |
| 2002/0040912 | A1 | 4/2002 | McHugh | |
| 2003/0130762 | A1 | 7/2003 | Tomassi | |
| 2005/0060062 | A1 * | 3/2005 | Walker | G06Q 30/02 700/236 |
| 2008/0087720 | A1 | 4/2008 | Levitov | |
| 2009/0281891 | A1 * | 11/2009 | Walker | G07F 9/002 705/14.38 |
| 2010/0010666 | A1 | 1/2010 | Adams | |
| 2012/0004770 | A1 | 1/2012 | Ooyen | |
| 2013/0054015 | A1 * | 2/2013 | Holman | G07F 17/0078 700/237 |
| 2013/0253700 | A1 | 9/2013 | Carson | |
| 2014/0067679 | A1 | 3/2014 | O'Reilly | |
| 2014/0316875 | A1 * | 10/2014 | Tkachenko | G06Q 30/0202 705/14.25 |
| 2015/0186969 | A1 * | 7/2015 | Holman | G06Q 30/0621 705/26.5 |

(Continued)

OTHER PUBLICATIONS

Rodriguez, Search Report from International Searching Authority, dated Aug. 3, 2021.

*Primary Examiner* — Michael Collins
(74) *Attorney, Agent, or Firm* — The Law Offices of Konrad Sherinian, LLC (57) ABSTRACT

A vending machine system is disclosed and claimed. In particular, the disclosed vending machine system allows multiple vendors to sell food items through a vending machine. The vending machine provides multiple locked bins, each of which can authenticate to a single vendor. Also, the vending machine implements price adjustment rules, such as raising the price of a particular item during, before, and after a high traffic event. In addition, customer dietary restrictions can be tracked, and purchases of food items that would violate those dietary restrictions can be prevented.

7 Claims, 9 Drawing Sheets

(56) References Cited

U.S. PATENT DOCUMENTS

| | | |
|---|---|---|
| 2016/0155127 A1 | 6/2016 | Hartman |
| 2016/0376102 A1* | 12/2016 | Cook, II .................. B65G 1/08 |
| | | 414/281 |
| 2017/0069148 A1* | 3/2017 | Gilbertson ......... G07C 9/00857 |
| 2017/0103185 A1 | 4/2017 | Adams |
| 2017/0228755 A1* | 8/2017 | Tkachenko ........ G06Q 20/3278 |
| 2017/0301173 A1 | 10/2017 | Hindsgaul |
| 2019/0206174 A1 | 7/2019 | Miu |
| 2019/0251776 A1* | 8/2019 | Adelberg ............. G06Q 10/087 |
| 2020/0034807 A1 | 1/2020 | Shamai |
| 2020/0114523 A1* | 4/2020 | Knuepfel ................. B25J 9/026 |
| 2020/0273042 A1 | 8/2020 | Wang |

\* cited by examiner

NETWORKED FOOD PREPARATION AND VENDING SYSTEM

CROSS-REFERENCE

None.

FIELD OF THE DISCLOSURE

The present disclosure relates to vending machines. More particularly; embodiments of the present disclosure relate to a networked food preparation and vending system, and more particularly still, embodiments of the present disclosure relate to a networked food preparation and vending system that can adjust prices based on an external calendar of events.

BACKGROUND

Vending machines are well known. Typically, a vending machine will include storage and dispensation of items, such as snacks (bars of various kinds, chips of various kinds, candies), beverages, such as soft drinks (typically refrigerated), and other food items. Briefly, prior art vending machines are periodically loaded with items such as those listed above and then dispensed in response to orders placed by a user, typically using a selection panel on the machine.

More complicated vending machines are known as well. Vending machines that are capable of preparing certain foods are well known. For example, BiCom, an Italian company, is presently marketing a vending machine that it claims is capable of preparing and vending certain Italian dishes. Also, networked vending machines have been discussed in the art since at least 1998, and, starting around 2010, several IoT ("Internet-of-Things") enabled vending machines have been marketed, sold, and deployed throughout the world. Such networked vending machines typically provide for advanced inventory management features, as well as credit card acceptance, and even accepting payment through means such as Apple Pay and Google Wallet. Most recently, advanced vending machines even allow orders to be placed via mobile devices (such as cellphones and tablets).

Vending machines are typically located in high traffic areas where people will have limited access to restaurants, such as factories, office buildings, airports, and workout centers. Often, vending machine operators find that their machines are frequented by the same people day-after-day, which allows them to build habitual behavior and brand loyalty. Such vending machines often make for superb automated sales and marketing platforms.

While vending machines have certainly been successful in marketing impulse products, vending machines have not been able to make the jump to automated food preparation platforms. In particular, despite the proliferation of IoT capable vending machines, inventory management issues persist. Inventory management issues can include stocking too much of a particular item, or too little of another, and translate into predictable consequences; i.e., items expiring before being sold, or not having any of a popular item when an important event occurs, such as a school football game, or a large meeting at a company. In addition, poor inventory management in vending machines has made it impractical for vending machines to serve fresh food, such as vegetables, which typically has a short expiration date, despite refrigeration technologies being available in vending machines for many years.

In addition, prior art vending machines do not have significant food preparation capabilities. Rather, even modern vending machines that advertise food preparation capabilities have simple food preparation capabilities such as turnstile heaters. These capabilities are limited—there is no capability for a customer to order a burger or fresh French Fries (for example). Similarly, there is no provision for consumer choice, such as ordering a dish "spicy" or with certain options, such as a burger with lettuce, tomato, and onions.

Accordingly, a need exists for an improved vending machine that incorporates more extensive food preparation capabilities and inventory management capabilities than what has been seen in the prior art. In particular, there is a need for a networked vending machine with extensive inventory management capabilities, including price adjustment capabilities, as well as extensive food preparation capabilities and order taking capabilities.

OBJECTS OF THE DISCLOSURE

It is an object of the disclosure to provide a vending machine system that allows for efficient and profitable vending of healthy foods.

It is another object of the disclosure to provide a vending machine system that can provide a report to monitors of the eating habits of a monitored user.

It is another object of the disclosure to provide a vending machine system that allows for multiple vendors to load food items into a vending machine.

It is another object of the disclosure to provide a vending machine system that authenticates multiple vendors to load food items into a vending machine on a per bin basis.

It is another object of the disclosure to provide a vending machine system that allows for the vending of prepared foods.

It is another object of the disclosure to provide a vending machine system that allows for the vending of food items with optional ingredients.

It is another object of the disclosure to provide a vending machine system that allows users to place mobile orders.

It is another object of the disclosure to provide a vending machine system that allows users to place mobile orders and pick up their food items at a particular vending machine at a later time.

It is another object of the disclosure to provide a vending machine system that allows users to place mobile orders and reserve food items at a particular vending machine at a later time.

It is another object of the disclosure to provide a vending machine system that allows for rule-based adjustment of prices for food items.

It is another object of the disclosure to provide a vending machine system that allows for the increase of prices based on a schedule of high traffic events.

It is another object of the disclosure to provide a vending machine system that tracks customers' dietary restrictions.

It is another object of the disclosure to provide a vending machine system that prevents customers from ordering any food items that would violate their dietary restrictions.

Other advantages of this disclosure will be clear to a person of ordinary skill in the art. It should be understood, however, that a system, an apparatus or a method could practice the disclosure while not achieving all of the enumerated advantages, and that the claims define the protected disclosure.

SUMMARY OF THE DISCLOSURE

The present disclosure provides a vending machine system that provides several advantages over prior art vending machine systems. To start, the disclosed vending machine system is adapted to allow multiple vendors to load food items into a single vending machine. Accordingly, multiple vendors can effectively use the vending machine as a shop to sell their pre-packaged or individually prepared foods. In particular, in an embodiment of the disclosed vending machine system, a vending machine can include multiple storage bins, each with a separate lock. Each lock can be configured to allow a single vendor access, i.e., to authenticate the access of a single vendor.

In a further embodiment of the disclosed vending machine system, the vending machine includes a food preparation module that allows for the preparation and vending of prepared foods. In particular, the food preparation module allows for the heating of foods.

If a further embodiment of the disclosed vending machine, the vending machine includes a network interface that allows the vending machine to receive orders from remote users, i.e., from mobile device users and web users.

In a further embodiment of the disclosed vending machine, the vending machine includes several price adjustment rules. The price adjustment rules can include lowering the price as an expiration date approaches, or raising the price before, during, and after a high traffic event.

BRIEF DESCRIPTION OF THE DRAWINGS

Although the characteristic features of this disclosure will be particularly pointed out in the claims, the disclosed method and system, and how it may be made and used, may be better understood by referring to the following description taken in connection with the accompanying drawings forming a part hereof, wherein like reference numerals refer to like parts throughout the several views and in which:

A person of ordinary skills in the art will appreciate that elements of the figures above are illustrated for simplicity and clarity and are not necessarily drawn to scale. The dimensions of some elements in the figures may have been exaggerated relative to other elements to help to understand the present teachings. Furthermore, a particular order in which certain elements, parts, components, modules, steps, actions, events and/or processes are described or illustrated may not be required. A person of ordinary skills in the art will appreciate that, for simplicity and clarity of illustration, some commonly known and well-understood elements that are useful and/or necessary in a commercially feasible embodiment may not be depicted to provide a clear view of various embodiments per the present teachings.

DETAILED DESCRIPTION

In the following description of various examples of embodiments of the disclosed system and method, reference is made to the accompanying drawings, which form a part hereof, and in which are shown by way of illustration various example devices, systems, and environments in which aspects of the disclosed system and method can be practiced. Other specific arrangements of parts, example devices, systems, and environments, can be used, and structural modifications and functional modifications can be made without departing from the scope of the disclosed system and method.

Figure 1:
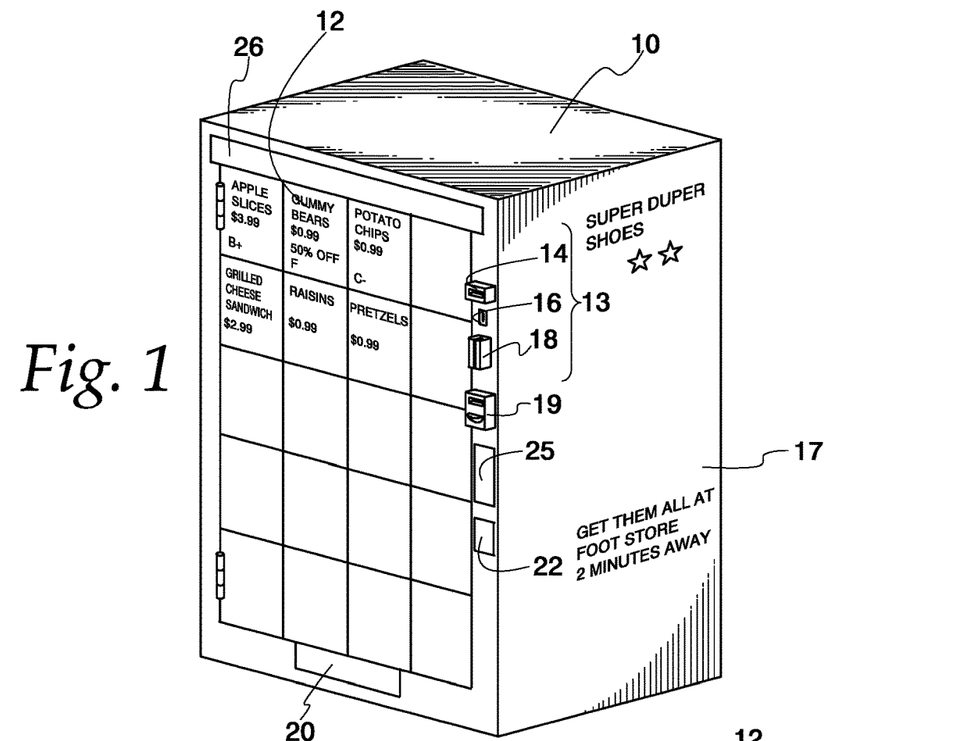
FIG. 1 is a perspective view of the front of a vending machine constructed in accordance with this disclosure.

Turning to the Figures and FIG. 1 in particular, a vending machine 10 constructed in accordance with this disclosure is shown. The vending machine 10 includes a housing 11, which in this case is depicted as rectangular cuboid housing 11 as is typical of vending machines. However, the housing 11 is not limited to a rectangular cuboid; for example, the housing 11 could be cubical, a triangular right prism, cylindrical, or other types of shapes. The vending machine 10 also includes a front panel 12. The front panel 12 can be substantially transparent to allow the items within the vending machine 10 to be displayed. In a preferred embodiment of the disclosed vending machine 10, the front panel 12 can consist of a touch screen coupled to housing 11 by one or more hinges so as to allow the front panel to be opened (as discussed below). The front panel 12 can allow a user (not shown) to make selections by manipulating the front panel 12 using touch controls.

The vending machine 10 also includes a payment processor 13. The payment processor can include, for example, a bill reader 14, a coin slot 16, an electronic payment processor 18, and a money return 19. The bill reader 14 is adapted to recognize, validate, and accept paper currency (bills) as payment. The coin slot 16 performs a similar function to the bill reader 14, but with coin currency. The electronic payment processor 18 can perform several functions. First, the electronic payment processor 18 can read and charge credit cards, debit cards, and certain gift cards. Second, the electronic payment processor can interface with mobile devices to charge e-wallets, such as Apple Pay®, and Google Wallet®. A secondary set of controls 25, which could be a second, much smaller, touch screen, or some other configuration of controls, allows a user to make additional selections. An access mechanism 22, which can be an electronic lock or a physical lock, allows the front panel 12 to be swung open as discussed below. A vending slot 20 is disposed so as to allow items to be vended by the machine using techniques known in the art.

Figure 2:
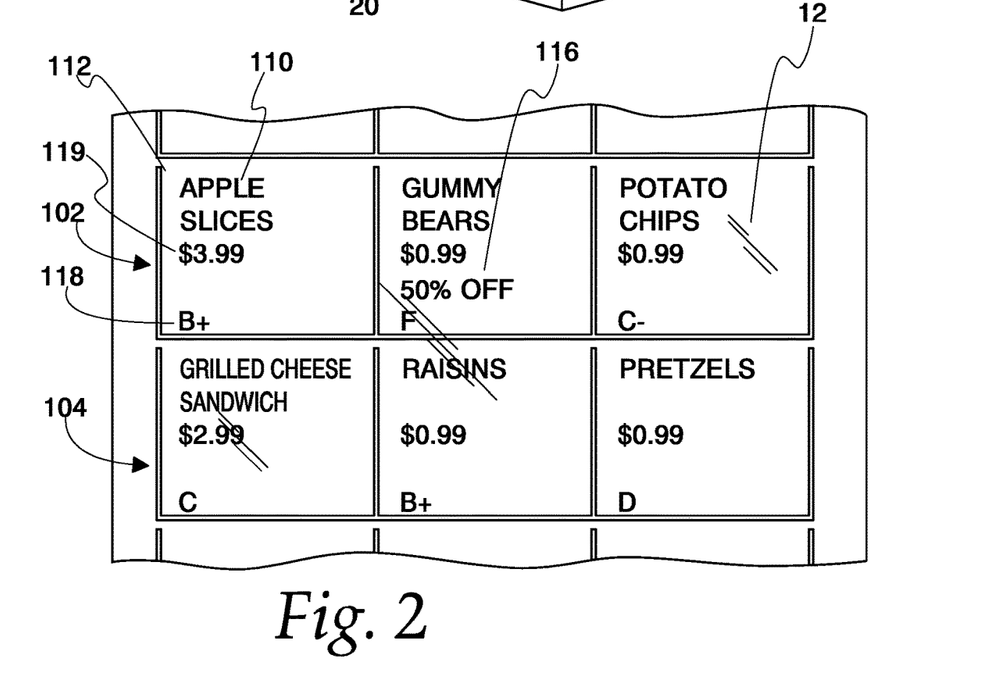
FIG. 2 is a front view of two rows of bins disposed of in a vending machine constructed in accordance with this disclosure.

Turning to FIG. 2, a view of several items on the front panel 12 is depicted. In particular, a first row of item slots 102 and a second row of item slots 104 are shown. Each of the item slots holds a particular food item. In front of each food item 110, several attributes about the food item 110 are displayed on the front panel 12. The attributes include a description 112, a price 114, a percentage off 116, and a grade 118. When an item is not discounted field 116 would not be shown. Description 112 is a simple description of the item, such as, for example, "Apple Slices". The price 114 of the item is a price displayed in the local currency, such as dollars. Finally, grade 118 is an indication of the quality of the food item; specifically, it is a grade related to how healthy (nutritious) the food is. Accordingly, very healthy food with a high nutritional content would receive a grade of A, while food that has essentially no nutritional content, had a high sugar content, or contained a known carcinogenic or toxic ingredient, would receive a grade of F. Additional information can also be shown, such as, for example, the calorie count, as well as whether a particular item is Vegan, Gluten Free, Dairy Free, and any particular allergens that the food contains, such as wheat, soy, peanuts, dairy, etc. In addition, a QR code can be displayed, with the QR code encoding in a small space additional information, such as the expiration date, which can be used by an external camera to automatically trigger discounts as part of an inventory control system or other IoT system.

In a further embodiment of the disclosed vending machine, the front panel 210 can display advertisements for various products, including products that are carried by the vending machine or other products. Similarly, display panels can be placed around the exterior of the entire vending machine; i.e., for the rectangular cuboid pictured in FIG. 2, not only the entire front panel would comprise a display, but the left, right, and rear panels would all comprise a display as well. All of the additional panels could also show advertisements.

Figure 3A:
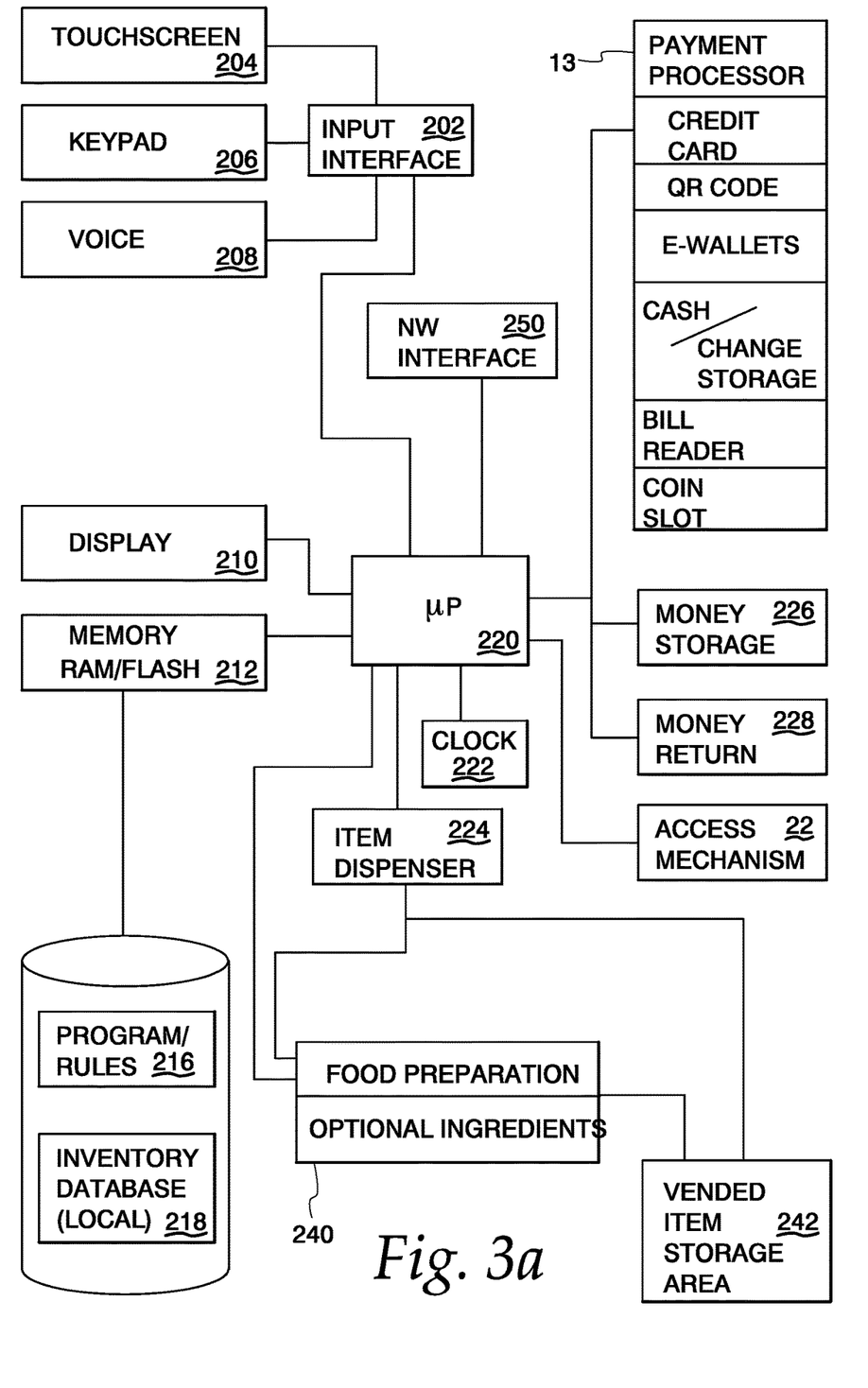
FIG. 3a is a simplified block diagram of a vending machine constructed in accordance with this disclosure.

FIG. 3a depicts a simplified block diagram of the primary components of an exemplary vending machine constructed in accordance with this disclosure. It should be noted that not all components of the vending machine are shown; for example, certain support components, packaging components, and other components are not shown.

As depicted, the vending machine 10 includes an input interface 202. The input interface 202 can include, for example, a touch screen 204, which can be integrated with or laid over a transparent front panel 12 as discussed with regards to the previous figures. Generally, a touch screen 204 The input interface 202 can also include a keypad 206 and/or a voice input 208. The keypad 206 can comprise, for example, a grouped collection of buttons, or a collection of buttons dispersed about the vending machine, such as on the front panel 12 near each of the items to be vended. The voice input 208 can comprise, for example, a microphone and speaker, and operate similarly to smart speakers, which are well known in the art. The input interface 202 can include any combination of a touchscreen 204, keypad 206, and a voice input 208, as well as additional input elements, such as a trackpad, trackball, joystick, additional buttons, etc.

In certain embodiments of the disclosed vending machine 10, the vending machine 10 can also include a display 210. This display would, for example, allow the interface discussed with FIG. 2 to be implemented, although the display could be a simpler and smaller display than the "whole front panel" display discussed previously. For example, the display 210 could be a simple LCD, either standalone or integrated with a touch screen 204, that indicates what products were purchased, whether a change was being made, etc.

The input interface 202 and display 210 (when present) are coupled to a processor 220. The processor 220 acts as the "brains" of the vending machine. It can be any microprocessor or micontroller sufficiently powerful to accomplish the functions of the vending machine 220, including interfacing with the input interface 202, driving the display 210 (if present), and other functions. The processor 220 interfaces with memory 212, including random access memory and persistent memory, such as FLASH memory. In certain embodiments, the processor 220 can partially or completely incorporate the memory 212; i.e., certain types of processors come with integrated memory, and in other embodiments, the memory 212 can be entirely external in the form of memory chips, memory modules, etc. The memory 212 may require additional support components, such as controllers, power conditioning circuitry, etc., which is not shown here for the sake of simplicity.

The memory 212 contains a program 216, including the pricing rules discussed herein, as well as an inventory database 218. The inventory database maintains a precise count of the amount of each item contained in the vending machine.

The processor 220 can include a clock 222 or interface with an external clock 222. The processor 220 also interfaces with an item dispenser 224. The item dispenser 224 can be incorporated into each of the item slots (not shown) or comprise a movable "arm" that can be positioned to grasp a particular item and move it to the dispensing area. The item dispenser 224 can also be implemented in other ways that are known in the art.

The processor 220 is also coupled to a payment processor 13. The payment processor 13 can include, for example, a bill reader and a coin slot. In addition, as is known in the art, the payment processor 13 can also include an electronic payment processor that can charge credit cards and e-wallets, such as Google Wallet and Apple Pay. If the vending machine 10 accepts cash currency (bills and coins), then it can also include money storage 226 and a money return 2 within the 28. Finally, the payment processor can also include a QR code reader, wherein the QR code can represent a user unique wallet for currency that can be redeemed within the vending machine system. In particular, a user can use the QR code to either make purchases, or to authenticate herself, so as to pick up remote purchases at a particular vending machine.

In certain embodiments, the vending machine 10 can also include a food preparation module 240. The food preparation module 240 can include, for example, an internal toaster or microwave, as well as an internal motion device, such as a rotating area, to ensure that heated food is heated uniformly. In particular, when an item is selected by a user (not shown) that requires preparation, the item dispenser 224 can move the item to the food preparation module 240 instead of vending the item directly to the user. The food can then be prepared and placed onto a vending package, such as a cardboard plate. Any optional ingredients, such as ketchup packets, wrapped tomato slices, lettuce slices, onion slices, etc., can also be added to the vending package. In addition, in such an embodiment, the vending machine 10 can include a vended item storage area 242. As explained further below, certain purchases (prepared or otherwise) can be moved to the vended item storage area 242 in certain embodiments.

In certain embodiments, the vending machine 10 can also include a network interface 250. The network interface 250 can be a wired interface, such as an Ethernet interface or a wireless interface, such as an 802.11 interface or a cellular interface. As explained below, in certain embodiments, the vending machine 10 can accept remote orders from customers using, for example, mobile devices, tablets, and web devices (such as laptop or desktop computers).

The processor 220 also interfaces with an access mechanism 22. The access point 22 can be, for example, an electronic authentication module coupled to an electronic lock. Alternatively, the access point 22 can be a simple physical lock adapted to open via a physical key. The function of the access point 22 is to allow the front panel 12 to open up as explained below.

Figure 3B:
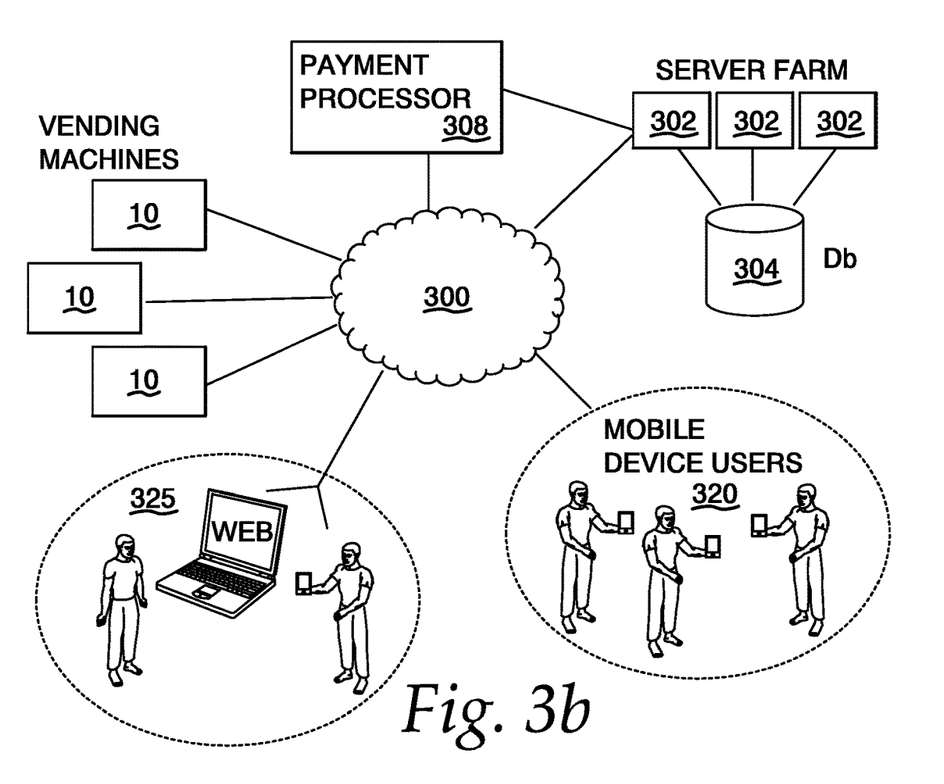
FIG. 3b is a simplified network diagram of a vending machine system constructed in accordance with this disclosure.

Turning to FIG. 3b, a network diagram depicting a system of vending machines 10, the Internet 300, a server farm 302, a networked database 304, a payment processor 308, and a collection of mobile device users 320 and web users 325. Mobile device users 320 can include smartphone users, tablet users, smartwatch users, wearable device users, and other mobile device users. Web-users 325 can include desktop users, laptop users, and mobile web users.

In particular, mobile device users 320 and web users 325 can place orders via the Internet 300. The orders are received by the server farm 302 and routed to a target vending machine 10, i.e., a vending machine located at a specific location. Before routing the order, the server farm 302 consults the database 304 to ensure that a specific requested item can be vended by the requested machine 10. If so, the server farm directs the user's device to make payment at the payment processor 308, which will confirm payment to the server farm 302. Once payment is confirmed, the server farm 302 updates the database to ensure that the inventory at the target vending machine 10 is updated, and then places the order with the target vending machine 10.

Figure 4:
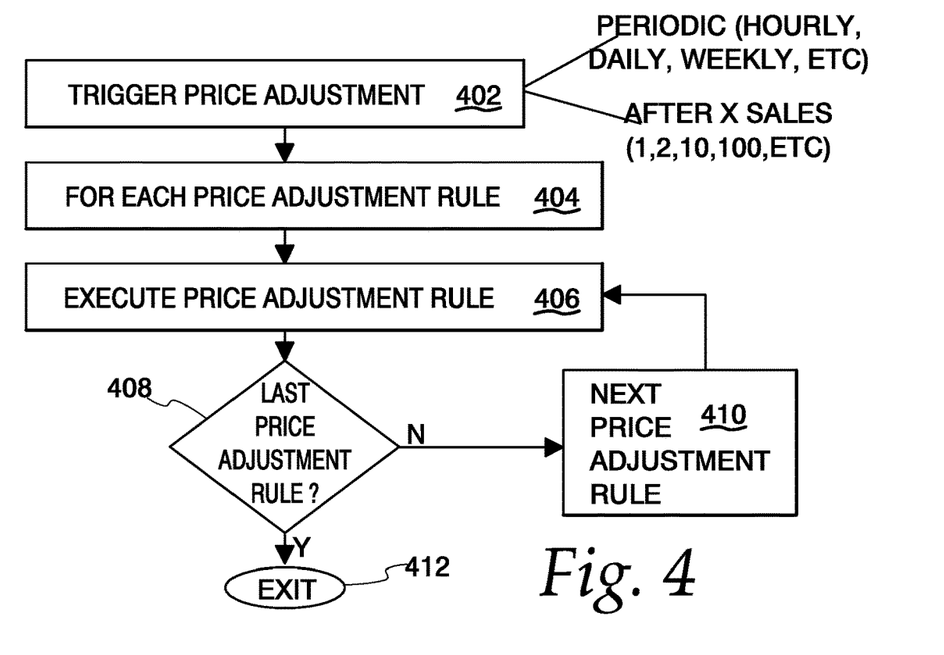
FIG. 4 is a simplified flow chart of a price adjustment algorithm for use with a vending machine constructed in accordance with this disclosure.

Turning to FIG. 4, a simplified flow chart depicting how price adjustment rules are applied by the disclosed vending machine 10 and mobile ordering system. The disclosed vending machine 10 can implement several price adjustment rules to maximize the value of goods sold as well as to drive certain objectives, such as encouraging consumers at certain locations to consume healthy foods. A listing of potential price adjustment rules is shown below:

Rule No. 1.
Rule Description Lower Price of Item No. 1 (Sliced Apples) When 72 Hours From Expiration.
Unadjusted Price $3.99.
Adjusted Price $2.49.
Rule No. 2.
Rule Description Lower Price of Item No. 1 (Sliced Apples) When 24 Hours From Expiration.
Unadjusted Price $3.99.
Adjusted Price $0.99.
Rule No. 3.
Rule Description Increase Price of Item No. 13 (Potato Chips) From 1 Hour Before High Traffic Event Until 1 Hour After High Traffic Event.
Unadjusted Price $0.99.
Adjusted Price $1.29.
Rule No. 4.
Rule Description Increase Price of Item No. 13 (Potato Chips) If More Than 3 Purchases Within Last Hour.
Unadjusted Price $0.99.
Adjusted Price $1.39.
Rule No. 5
Rule Description Decrease Price of Item No. 13 (Potato Chips) If Less Than 20 Purchases Within Last Thirty Days
Unadjusted Price $0.99
Adjusted Price $0.79
Rule No. 6
Rule Description Decreate Price of Item No. 13 (Potato Chips) If Less Than 10 Purchases Within Last Thirty Days
Unadjusted Price $0.99
Adjusted Price $0.59

Such rules can be used for inventory management, as well as to implement manufacturer programs; i.e., nationwide discounts, area discounts, or other types of promotions from a specific manufacturer. All of these price adjustment rules and other price adjustment rules based on user-created combinations of the initial price, an adjusted price, time in days or hours before item expiration date, item quantity, sales of an item within a period in hours or days, and time in hours or minutes before a high traffic event can be implemented using the algorithm shown in FIG. 4. In step 402, the price adjustment algorithm is triggered. The price adjustment algorithm can be triggered in several ways depending on the particular implementation of the vending machine. However, some ways that the price adjustment algorithm can be triggered would be periodical, such as once per minute, once per hour, etc., or after a particular number of sales, such as after every sale, after every two sales, or after every ten sales. Other trigger mechanisms can be used as well; i.e., the price adjustment algorithm can be triggered after a particular dollar volume of sales, etc.

Turning to step 404, the list of price adjustment rules is iterated through by the algorithm, starting with the selection of the first price adjustment rule. Next, in step 406, the presently selected price adjustment rule is executed; i.e., if the presently selected rule is rule number 1, that rule is executed; if the presently selected rule is rule number 2, that rule is executed, etc. Taking rule number 1 listed above as an example, one way that the rule could be executed would be for the processor 220 to verify with the inventory database 218 that there were still sliced apples to dispense. The processor 220 would then reference the database 218 to check the expiration date of the sliced apples and compare it to the present date and time using the clock 222, and if the expiration date of the sliced apples were within 72 hours of the present date and time, the processor would adjust the price of the remaining sliced apples from $3.99 to $2.49. Similarly, taking rule number 3 as an example, one way that the rule could be executed would be for processor 220 to verify with the inventory database 218 that there were still potato slips to dispense. The processor 220 would then reference the database 218 to determine if there were any high traffic events. If so, the processor would iterate through the high traffic events, and consult the clock 222 to check whether the present time was within the range of 1 hour before the high traffic event until 1 hour after the high traffic event; if so the processor would adjust the price of potato chips from $0.99 to $1.29.

In step 408, a check is made to determine if the selected price adjustment rule is the last price adjustment rule. If not, execution transitions to step 410, where the next price adjustment rule is selected. For example, if the presently selected price adjustment rule is 1, then price adjustment rule 2 would be selected. However, in step 408, if the last price adjustment rule is presently selected, execution would transition to step 412, and the price adjustment algorithm is exited.

Figure 5:
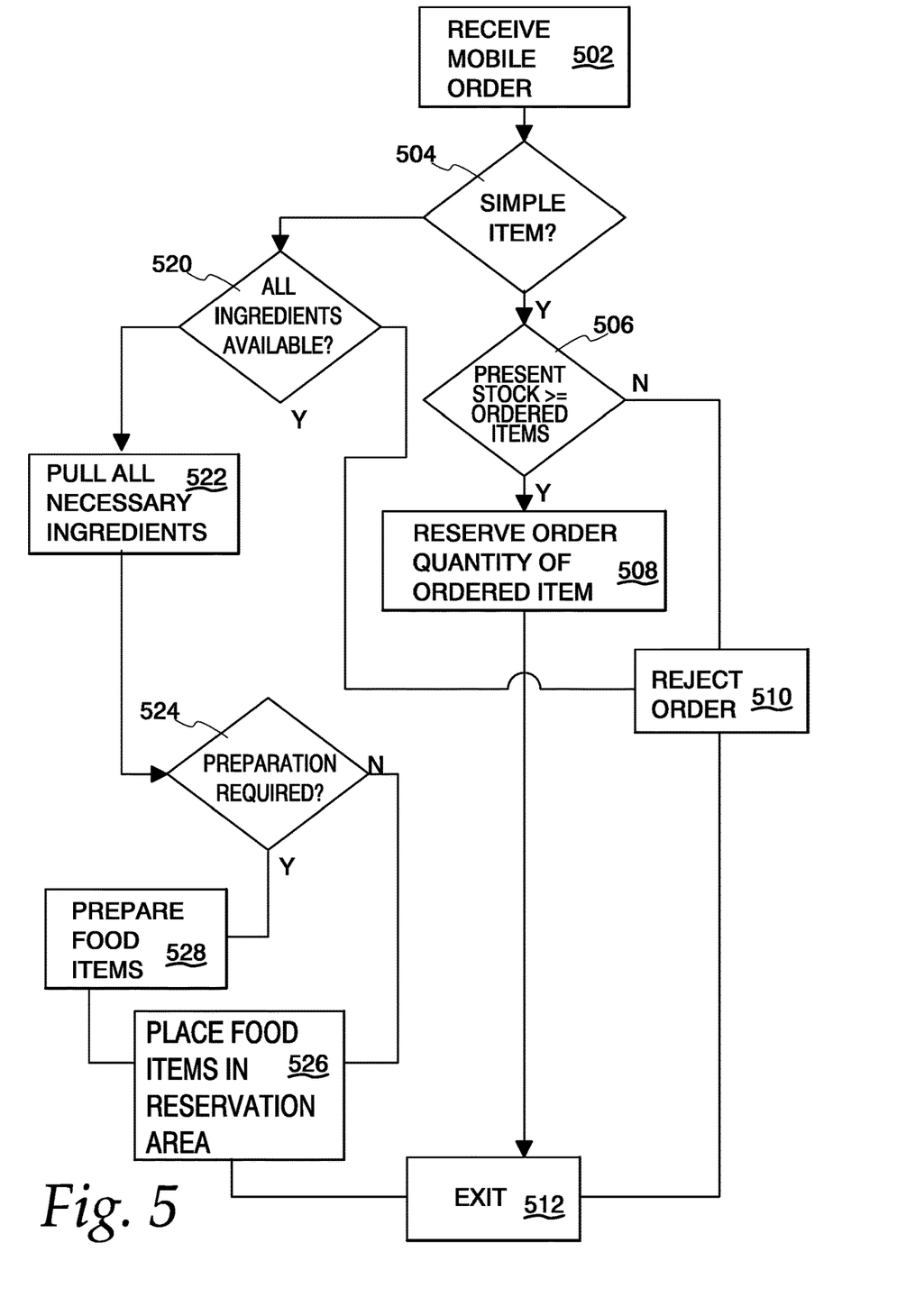
FIG. 5 is a simplified flow chart of a mobile order algorithm for use with a vending machine system constructed in accordance with this disclosure.

Turning to FIG. 5, a simplified flow chart depicting how mobile orders can be accepted by a vending machine constructed in accordance with this disclosure. In particular, mobile and web customers will make orders via their devices using the Internet 300. The server farm 302 will then process those orders, ensure availability using the database 304, and process payment using the payment processor 308. The order will then be routed to a particular vending machine 10, where it is processed using the algorithm disclosed in FIG. 5.

In step 502, the mobile order is received by a particular vending machine 10. In step 504, the processor 220 consults the database 218 to determine if the item is a simple item or an item that requires preparation or has optional ingredients. If the ordered item is a simple item execution transitions to step 506, where a check is made to determine if there is sufficient remaining inventory of the ordered item. If yes, execution transitions to step 508, where the processor 220 reserves the number of the ordered items, i.e., it will prevent that number of items from being vended or ordered by others. On the other hand, at step 506, if there is not sufficient inventory of the ordered item, execution transitions to step 510, where the processor uses the network interface 230 to notify the server farm 302 that the order was rejected, after which the algorithm is exited in step 512.

Returning to step 504, if the ordered item is an item that requires preparation or has optional ingredients, execution transitions to step 520, where the processor 220 consults the database 218 to determine if all of the ingredients for the order are available. If all ingredients are not available, execution transitions to step 510, where the order is rejected, and the server farm 304 is notified using the network interface 230, after which the algorithm exits in step 512.

At step 520, the processor 220 identifies all necessary ingredients using the food dispenser 224 and the optional ingredient storage of the food preparation module 240. Execution then transitions to step 524, where a check is made to determine if preparation is required. If no preparation is required, execution transitions to step 524, where the order is placed into a vending package and stored in the vended item storage area 242. However, at step 524, if preparation is required the items requiring preparation are prepared (generally heated) in the food preparation area 240 at step 528, after which the prepared food item is placed onto a vending package along with any optional ingredients and stored in the vended item storage area 242 in step 526. The algorithm then exits in step 512.

The server farm 302 can also offer special deals to vending machine customers. In particular, the server farm 302 can monitor sales of particular goods which are under performing or near their expiration date, and, as desired, offer nearby customers special deals. In particular, where a mobile device user 320 has an appropriate application installed on her mobile device, the server farm can periodically send "offers" to the user's device. Then, when the user comes close to a vending machine 10 for which an offer is made, the offer can display on the user's mobile device. Offers can be of a variety of types. An offer can be a straight discount, which can be used when it is desirable to move a particular product, such as when an expiration date is approaching, or when a product is a poor performer and the product is being offered on clearance. An offer can be an enticement, such as "buy one, get one free," or "buy one, and get one at 50% off." An offer can also be a promotion to encourage certain behavior, such as healthy eating, which could offer discounts on healthy foods (or foods with good grades). An offer can also be a free trial (or sample) of a product, as detailed in the algorithm of FIG. 6*b*.

Figure 6A:
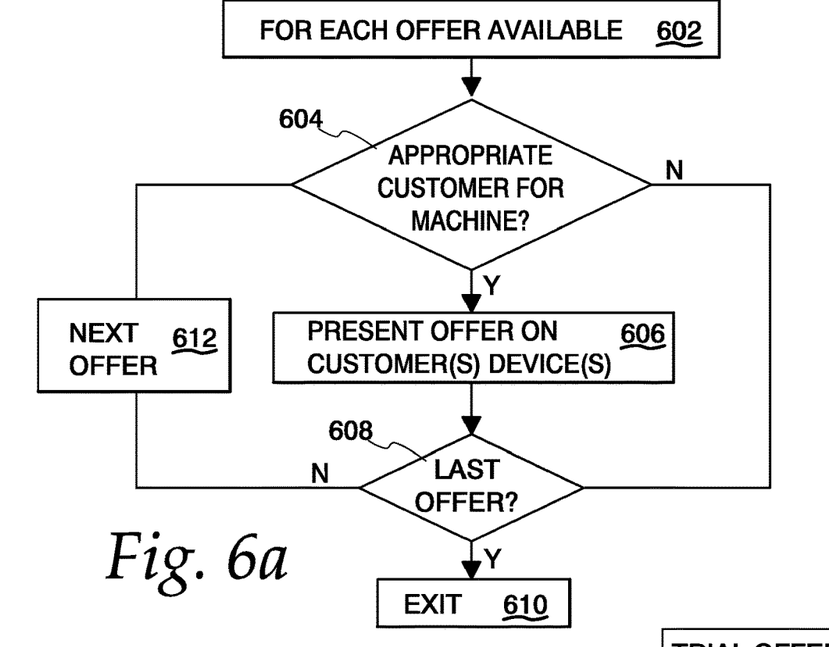
FIG. 6a is a simplified flow chart of an offer algorithm for use with a vending machine system constructed in accordance with this disclosure.

Offers can be made to vending machine customers using the algorithm of FIG. 6. In step 602, the processor on the mobile device iterates through the offers that have been downloaded to the mobile device, starting by selecting the first offer. In step 604, the mobile device processor determines if the customer appropriate for an offer from the particular vending machine. In particular, in step 604, the mobile device processor can determine if the customer is near any appropriate vending machine 10 using the location function of the customer's mobile device OR if the customer has ordered from that particular vending machine before—in the latter case, even if a customer is far away from a particular vending machine, the customer may be interested in an item that she can pick up at a later time. If not, the algorithm exits in step 610. However, in step 604 if the customer is near an appropriate vending machine, execution transitions to step 606, where the offer is presented to the customer on the customer's mobile device. In particular, a push notification such as that depicted in FIG. 11*a* can be presented, which, if selected, can present an in-app offer, such as that depicted in FIG. 11*b*. Both the push notification and in-app offer are discussed in more detail with regards to those figures.

In step 608, a check is made as to whether the presently selected offer is the last offer downloaded to the device. In step 608, if the presently selected offer is not the last, then execution transitions to step 612, where the next offer is selected, after which execution transitions to step 604. Similarly, at step 604, if the customer is not near an appropriate vending machine 10 for the presently selected offer, execution transitions to step 612, where the next offer is selected. In step 608, if the presently selected offer is the last, execution transitions to step 610, where the algorithm is exited.

As briefly mentioned above, trial offers (or free samples) can be offered to certain users. Trial offers can be generated by the vending machine operator, or by the item manufacturer using a supplied interface. A trial offer can made via a text message or an email message, and in such cases, will generally comprise a single use code in the message that the customer will need to enter within an app or web page. Alternatively, a trial offer can be made directly in app, in which case, the offer would be accepted by the user. Once an offer is accepted by the user, the offer is retired (not offered again). The algorithm by which such trial offers are made is shown, in simplified form, in FIGS. 6*b* and 6*c*. Starting in step 652, the processor of the mobile device can iterate through trial offers that have been downloaded to the mobile device using a vending app. In step 654, a check is made to determine if the particular customer is appropriate for the trial offer. The check in step 654 can include a check as to whether a vending machine stocking the trial offer product is located close to the customer, or whether a vending machine that the customer has ordered from before has the trial product offer, as well as an examination of the customer's prior purchasing history—in particular, if the customer has purchased similar or competing products before the trial offer may be made to the customer. If the customer is not appropriate for the selected trial offer, execution transitions to step 658, where a check is made to determine if the selected trial offer is the last trial offer that has been downloaded to the customer's device.

Figure 6B:
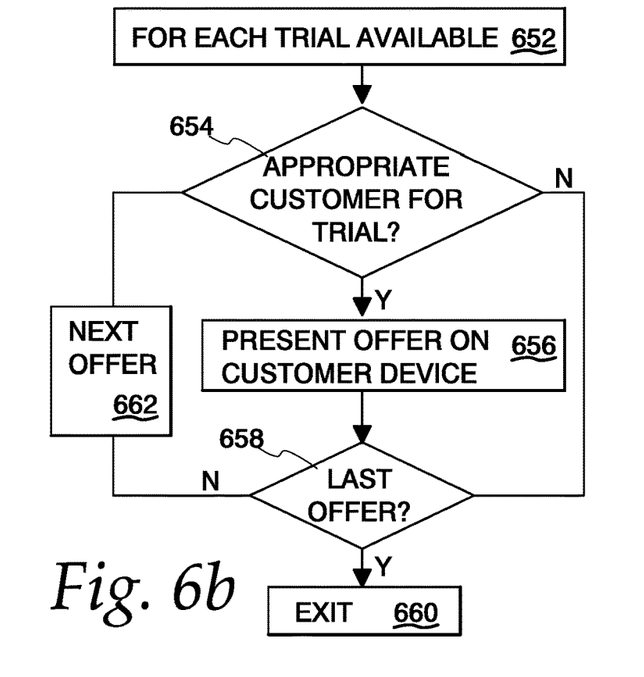
FIGS. 6b-6c are a pair of simplified flow charts of a product trial feedback solicitation algorithm for use with a vending machine system constructed in accordance with this disclosure.

However, if the customer is appropriate for the trial offer, execution transitions to step 656 where the trial offer is presented to the customer on the customer device. After this, execution transitions to step 658, where a check is made to determine if the selected trial offer is the last trial offer downloaded to the customer's device. If the selected trial offer is the last trial offer, then execution transitions to step 660, where the algorithm is exited. However, if there are more trial offers then execution transitions to step 662, where the next trial offer is selected, and then to step 654, where a check is made to determine if the newly selected trial offer is appropriate for the customer.

Figure 6C:
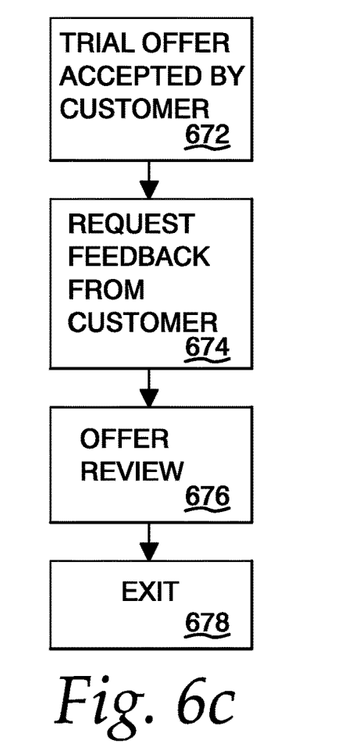

Turning to FIG. 6c, an algorithm is described by which a review can be gathered from customers that accept trial offers. In particular, the algorithm of FIG. 6c would be automatically initiated a fixed period of time after a user accepted a trial offer. For example, the algorithm of FIG. 6c could be initiated approximately 2 hours after a customer accepted a trial offer. In step 672, the algorithm is initiated. In step 674, an application or web interface on the customer's device requests a review from the customer on the trial offer product that the customer accepted. In step 676, the customer can optionally be offered a reward for the review that was obtained. The reward can be, for example, a small amount of currency to spend with the vending machine system, a discount on an amount of purchases, or another free product. In step 678, the algorithm exits. A review will generally include, for example, the product, and the specific vending machine (including the location of the specific vending machine) from which the trial product was obtained, as well as the user's demographic information; i.e., ethnicity, age, race, approximate income, etc.

Other modifications can be made to the trial offer algorithm. For example, a customer can be prevented from obtaining any other trial offers, unless she has provided a review for the first one. Alternatively, if a customer does not provide a review for a trial offer at the first prompting, the customer can be prompted multiple times at different intervals. For example, the first prompt can be made at 2 hours, the second prompt at 24 hours, and a third prompt at 72 hours.

A mobile app or web interface for customer use can also include additional features. For example, the mobile app or web interface can allow a customer to request that a vending machine offers a particular item or items; i.e., the customer can create a wishlist.

Figure 7A:
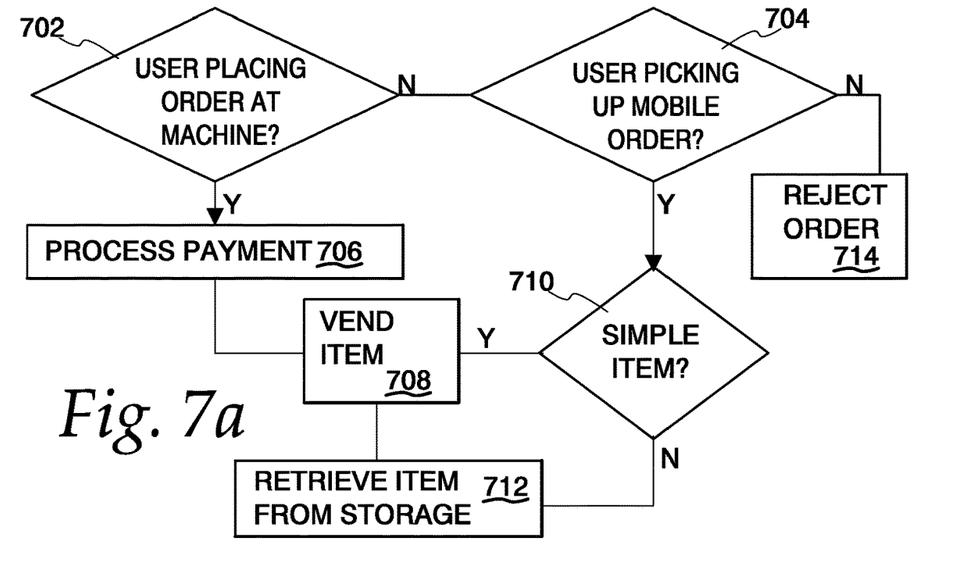
FIG. 7 is a simplified flow chart of a vending algorithm for use with a vending machine system constructed in accordance with this disclosure.

The primary purpose of the disclosed vending machine 10 is to vend items, and the overall process by which that is done is disclosed in FIG. 7a. In step 702, if the user is placing an order at the machine, execution transitions to step 706, where payment is processed using the payment processor 13. The item is then vended in step 708. Returning to step 702, if the user is not placing an order at the machine, execution transitions to step 704, where a check is made to determine if the user has an order to pick up at the vending machine 10. If not, a mistake must have been made (the user was told to pick up an order from the wrong machine, etc.), and the order is rejected in step 714. Any payment made by the user should be refunded as well.

Returning to step 704, if the user is picking up a mobile order, execution transitions to step 710, where a check is made to determine if the user is picking up a simple item. If so, the item is vended in step 708. However, if the item requires preparation or has optional ingredients, the vending package is retrieved from storage in step 712 and then vended in step 708.

Figure 7B:
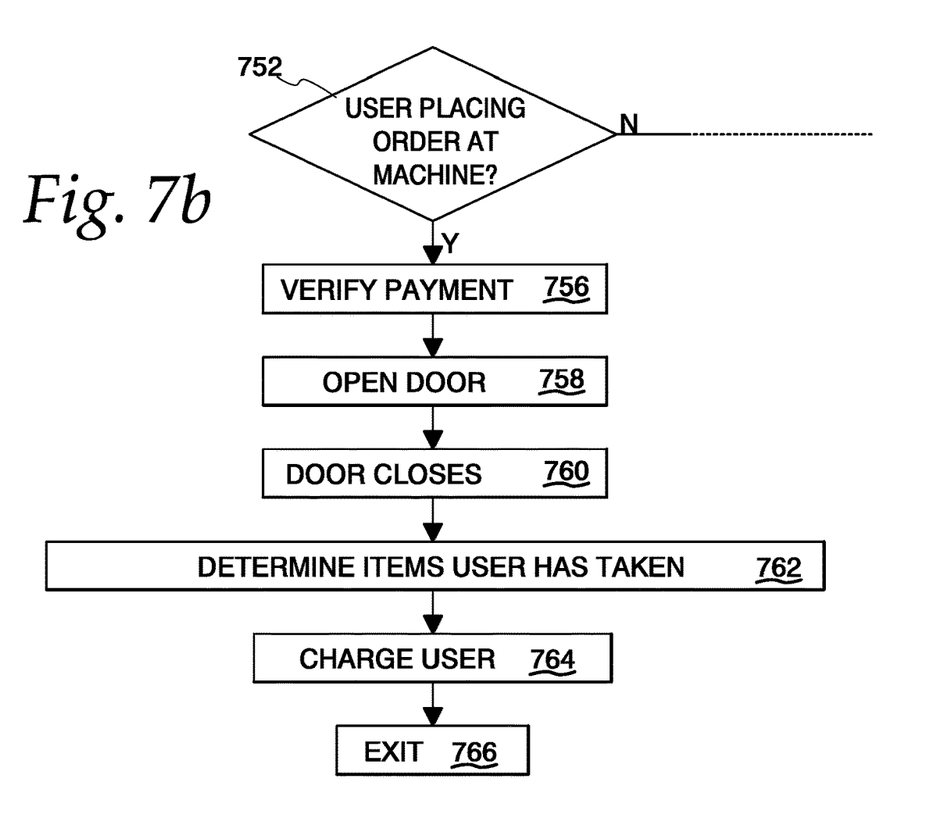

An alternative vending algorithm is shown in FIG. 7b. In particular, if a user is picking up an item or items that were ordered remotely using a mobile device or web interface, this algorithm will function identically to that discussed with regards to FIG. 7a. However, if a user is placing an order at the vending machine 10, the algorithm differs. In particular, in step 752, if the user is placing an order at the machine, execution transitions to step 756. Otherwise, execution will proceed from step 704 in FIG. 7a. In step 756, the vending machine 10 will verify payment using the payment processor 13; however, it will only verify a type of payment that can be contractually charged at a later time and tied definitively to a particular person, such as an e-wallet. Once payment is verified, the vending machine 10 will open up access to the item bins; for example, the front of the machine will open, and allow the customer to take whatever the customer wants to take. The customer will then either close the door in step 760, or the door will automatically close after no weight change is detected in any of the bins for a period of time; once the door is closed, access to the items in the vending machine 10 is shut off, and the items that the customer has taken are determined in step 762 by the processor 220. One way that the processor 220 could determine what is taken by the customer would be to measure the difference in weight of each bin before the door was opened and after the door was closed using a weight sensor in each bin. After an inventory of the items taken by the customer is determined in step 762, the customer is charged in step 764, after which the algorithm exits in step 766.

Figure 8:
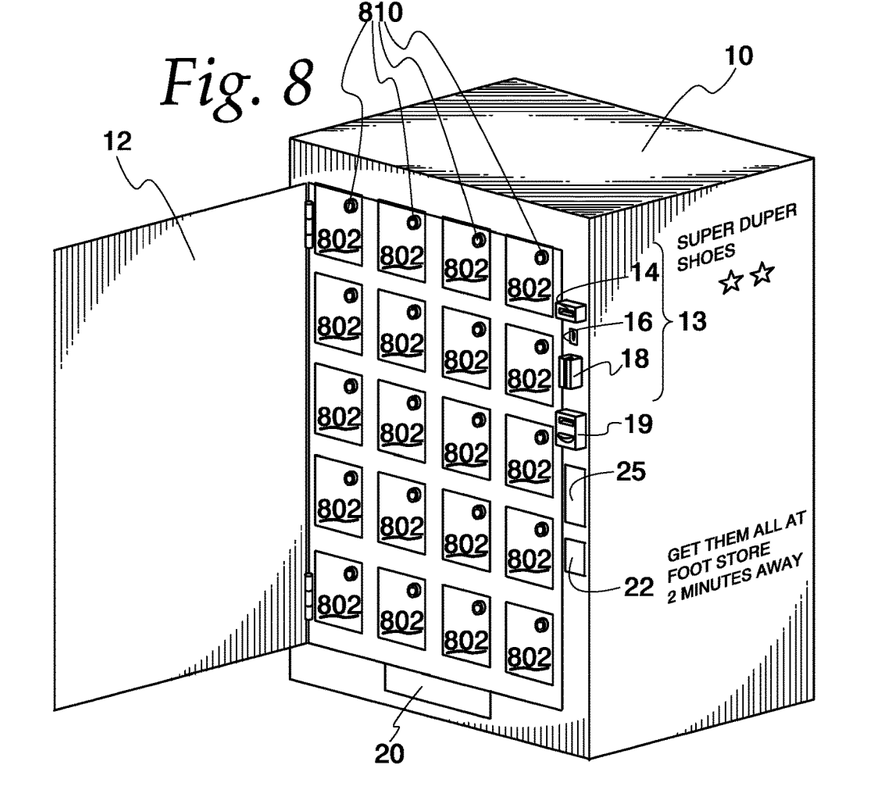
FIG. 8 is a perspective view of the back of a vending machine constructed in accordance with this disclosure.

One of the objectives of the disclosed vending machine is to allow multiple vendors to access the vending machine. To accomplish this, the vending machine allows a plurality of vendors to offer their food through the vending machine, and, to accomplish this, allows each item slot to be accessed and loaded independently. In particular, once the front panel 12 is opened, as depicted in FIG. 8, the item bins 802 are uncovered and accessible by a vendor. The front panel 12 can be opened using the access point 22, which, as discussed above, can be an electronic or physical lock. As shown, each item bin has an independent locked door 802. In particular, each door 802 has an independent lock 810. The authentication mechanism of the lock 810 can be a simple key, or it can utilize an electronic (app-based) authentication mechanism, i.e., a code sent from the app through the server farm 302 and relayed to the vending machine 10.

Figure 9:
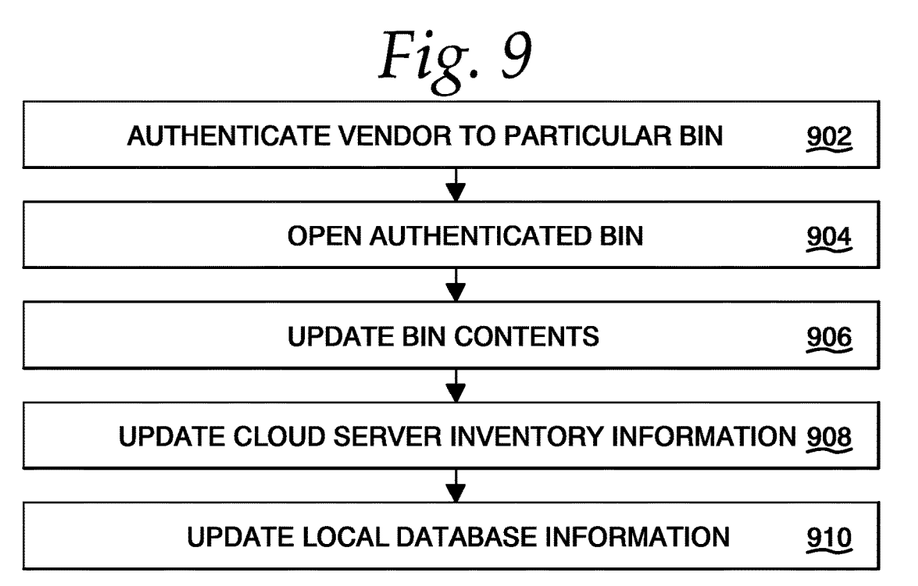
FIG. 9 is a simplified flow chart of a process by which a vendor can restock items stored in the vending machine.

Turning to FIG. 9, a process by which a vendor can access a particular item bin, and update the inventory of the items stored in the bin. In particular, in step 902, the vendor is authenticated to the bin. This authentication is through the lock 810 and can include a variety of authentication mechanisms. For example, authentication can be by way of a physical key, a fingerprint reader, a camera used for a retina scan or face identification, or by way of an electronic lock that is authenticated by way of an app running on a user's mobile device. It should be noted that a particular vendor can operate a single bin or several consecutive or non-consecutive bins, and a vendor that operated multiple bins would not need to be authenticated for each bin that the vendor operated. Rather, a single authentication would allow a vendor to access all of the bins that she operates.

After the vendor is authenticated, the authenticated bin or bins are opened in step 904, allowing the vendor to access the items in those bins. The vendor would then reload the items in the bins in step 906. In step 908, the cloud server inventory information, i.e., the database 304, is updated. The cloud server inventory information be updated by the vendor updating the cloud server inventory information. For example, if the vendor added four bags of potato chips to a potato chip bin, the vendor would add in each new item along with the expiration date for each to the database using an interface provided by the vending machine 10, a web interface, an app on the user's mobile device, or some other means. Alternatively, the vending machine 10 can utilize circuitry and programmatic intelligence to update the inventory information at the database 304. In particular, the vending machine can utilize, for example, a weight sensor in each bin, and any difference in weight would be noted at the processor 220. Using the difference in weight, as well as the average weight of the product in the bin, the processor 220 could then estimate the change in inventory, and send this quantity to the server farm 302. The new inventory could then be presented to a vendor on an application for confirmation, as well as input of additional information, such as expiration date, etc. Once the cloud server inventory information was updated, the server farm 304 would then update the vending machine's 10 local database 218.

Figure 10A:
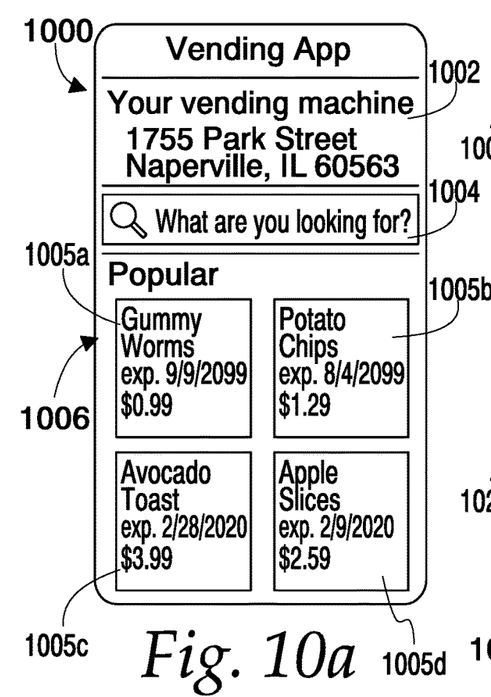
FIGS. 10a and 10b are screenshots of an application for placing a mobile order with a vending machine system constructed in accordance with this disclosure.

Turning to FIG. 10*a*, a mobile ordering interface 1000 is shown. The mobile ordering interface 1000 could operate on a user's mobile device as an app or could be in the form of a web page. As depicted, the mobile ordering interface 1000 comprises an address field 1002. The address field 1002 shows the physical address of the building that the vending machine is in, and can include, for example, a floor number or suite number. Also, by pressing on the address field, the user can be given the option to receive directions, or even to launch an application for directions. The mobile ordering interface 1000 also includes a search field 1004, which allows a user to search for a particular item, i.e., chips, candy bars, fruit, burgers, curry, etc. Finally, the mobile ordering interface 1000 includes an item panel 1006, which displays the items matching a user's search, or (as depicted) a ranking of featured or popular items. As depicted, the item panel 1006 displays four items 1008*a*, 1008*b*, 1008*c*, 1008*d*; however, it should be noted that any number of items can be displayed.

Figure 10B:
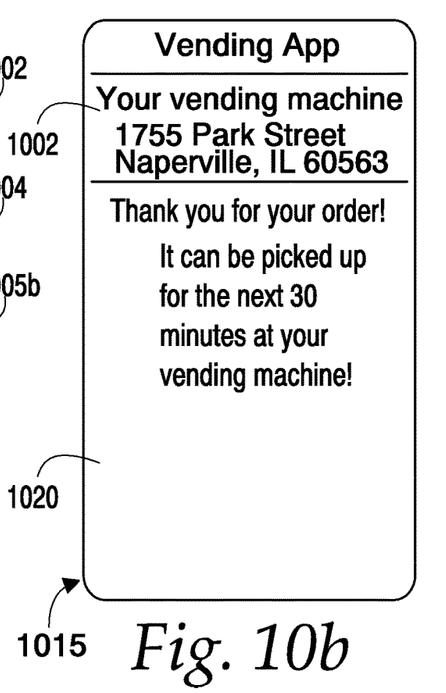

FIG. 10*b* shows an order confirmation screen 1015, i.e., a screen after an order has been placed. As depicted, the order confirmation screen 1015 includes an address field 1002, which functions identically as discussed with respect to the mobile ordering interface 1000. In addition, the order confirmation screen 1015 includes a confirmation field, thanking the user for the order, and indicating that the order can only be picked up for a limited time, or it will be forfeit or subject to an additional cost.

Figures 11A, 11B:
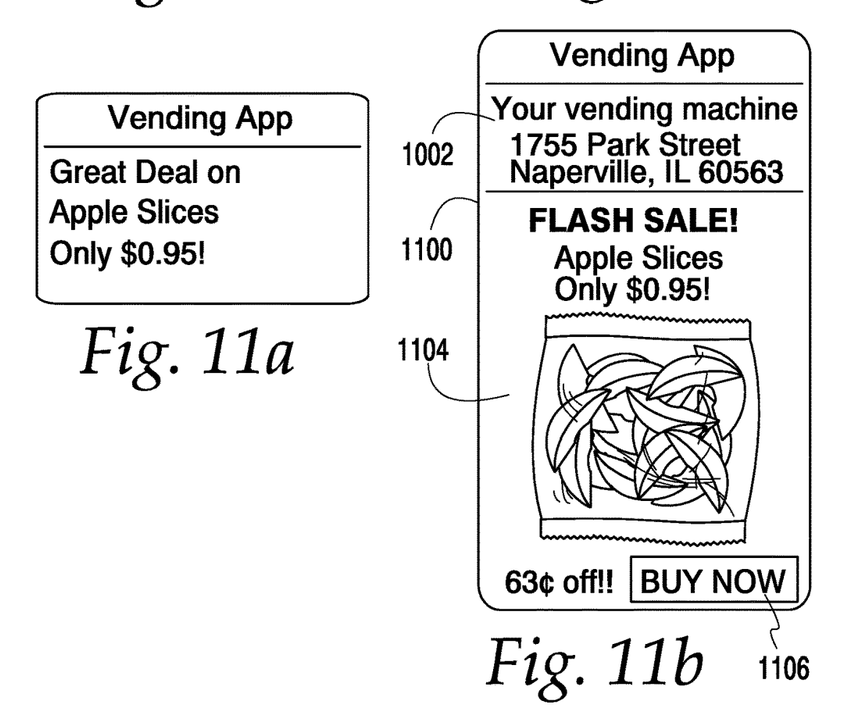
FIG. 11a is a screenshot of a push notification for a special offer for a vending machine item.
FIG. 11b is a screenshot of an application for accepting a special offer of a vending machine item.

Turning to FIGS. 11*a* and 11*b*, a special offer interface is shown. In particular, the disclosed vending machine 10 can utilize push notifications, such as that depicted in FIG. 11*a*. The push notification would only be sent to the user if she was within a certain distance of the vending machine, such as 1 mile or two blocks. The push notification would work as such notifications typically do; i.e., it would present the deal to the user, and, if the user selected the push notification, it would take the user into the application, where an offer page, such as that depicted in FIG. 11*b*, would be displayed.

The offer page 1100 includes an address field 1002, which shows the location of the vending machine for which the offer applies—the address field 1002 functions as discussed previously. The offer page 1100 also includes an offer panel 1104. The offer panel 1104 displays the item, details of the offer including the new price and discount, and an order interface 1106, which allows the user to purchase the offered item.

Figure 12A:
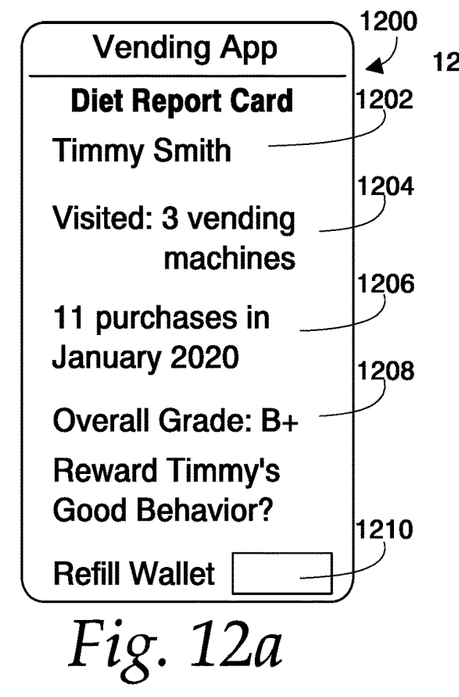
FIG. 12a is a screenshot of a monitor report for a monitored user.

One of the objectives of the disclosed vending machine is to encourage users to purchase fruits, vegetables, and other healthy foods. To help accomplish this objective, reports on ordered and vended food can be obtained by monitors. Monitors can include, for example, parents, guardians, coaches, school teachers, insurers, physicians, and employers. In particular, a monitor can be given a report card that summarizes a user's food purchases over some time, such as, for example, one month. An example report card 1200 is depicted in FIG. 12.

As depicted, the report card 1200 includes a name field 1202, that shows the monitored user's name. The report card 1200 also displays a visited machine field 1204 that shows the number of vending machines that were visited, and, if selected, can show a listing or map of the vending machines that were visited, including the specific locations and addresses of the visited vending machines. The report card 1200 also includes a summary of purchases 1206. The summary of purchases can also be selected to show the specific purchases, as well as the dates they were made, and a summary of their health information, i.e., nutritional grade, calories, sugar, fat, etc.

The report card 1200 also displays an overall grade 1208 for the monitored user. The monitored grade 1208 can also be selected, and a summary of the inputs to the grade can be displayed. Finally, if the monitored user's grade is good, the monitor can be given an option to reward the monitored user's good eating habits by giving the monitored user additional funds to spend in their wallet. The reward can be through a refill wallet control 1210. The refill wallet control 1210 can directly add funds to the monitored user's e-wallet or can add money to a custom e-wallet that can only be spent with the disclosed vending machine 10.

Finally, a monitor can, in an alternative embodiment, be notified if a monitored user attempts to make a particular type of purchase, such as a purchase of high sugar foods. The monitor can then approve the particular purchase or deny the particular purchase. For example, the monitor can receive an email, text message, or an app notification (push notification) indicating that the monitored person is attempting to make a proscribed purchase. The monitor would then be able to use the application to allow or decline the purchase. In another alternate embodiment, the monitor can pre-approve certain classes of food purchases, such as fruits and vegetables, while not allowing any other types of food purchases. In such a case, a monitor that attempted to purchase a high sugar food, such as a sugary soft drink, would not be able to make the purchase. Finally, in an alternate embodiment, a monitor can pre-approve certain classes of food purchases, such as fruits and vegetables. However, when a monitored user attempts to make a purchase outside of the pre-approved types of food, the monitor would receive a request to approve the food purchase; if allowed, the purchase would go through, and if denied, it would not.

The vending machine system described herein can also maintain individual customer profiles. Customer profiles can have two components; first, a portion that is created and entered by the customer, and second, a portion that is automatically created based on the user's purchases. With regards to the latter point, all purchases made by a particular user, including the item purchased, the amount paid, and the location of the vending machine where the item was purchased, will be maintained in the customer profile.

Figure 12B:
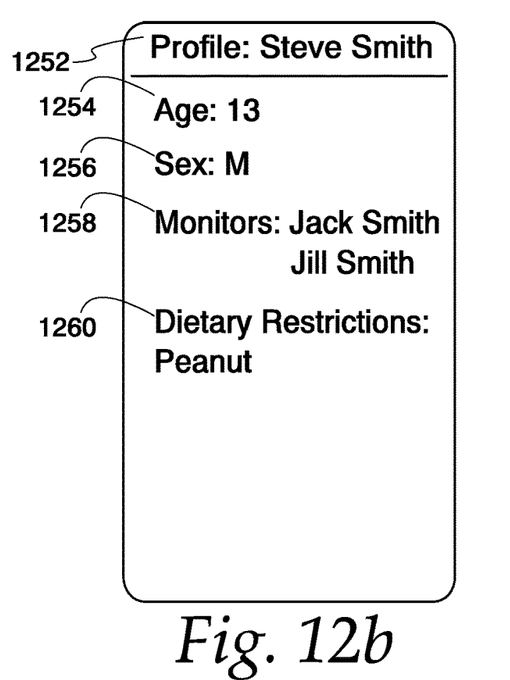
FIG. 12b is a screenshot of a customer profile for a customer.

Turning to FIG. 12b, a screenshot of a customer profile is shown, including the information that is entered by the customer. Field 1252 shows the user's name, and field 1254 shows the user's age, while field 1256 shows the user's sex. The information contained in these fields can be manually entered by the user, or taken from an external source such as Facebook or Google. In field 1258 any monitors, such as those discussed previously, are setup. Once setup, the monitor field 1258 can be adapted to be no longer modifiable by the customer—rather, the monitor field 1258 would effectively be locked, so that a monitored customer would not be able to easily free themselves from the oversight of the monitor or monitors. Finally, the profile contains a dietary restriction field 1260. The dietary restriction field 1260 contains any dietary restrictions that the customer has; i.e., a peanut allergy, celiac (gluten), lactose (dairy) intolerance, etc. The dietary restriction field 1260 is used to completely block the customer from purchasing any foods that contain ingredients that are not allowed by the user's dietary restriction; for example, the customer shown has a peanut restriction; accordingly, any order's made by the customer for a food item with peanuts would be rejected by the vending machine, and the customer would be notified that the desired food item contains peanuts.

Figure 13:
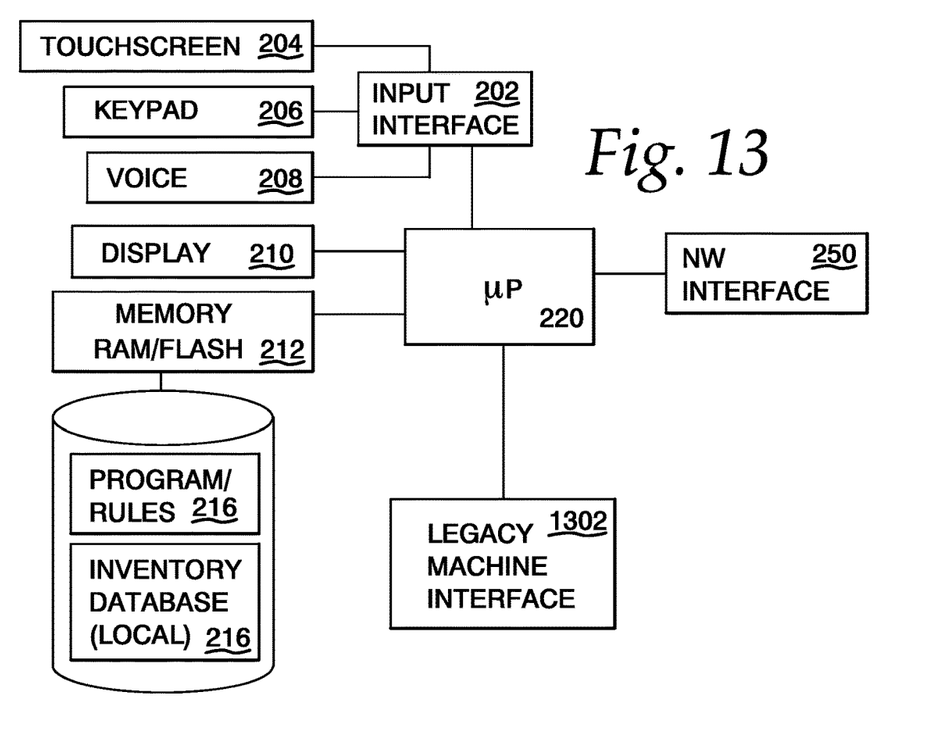
FIG. 13 is a simplified block diagram of an add on module for use with existing vending machines.

While the disclosed vending machine has been discussed in terms of a new type of vending machine, in an alternate embodiment, an add-on module can also be implemented, which could be used to retrofit existing vending machines with the upgraded capabilities outlined herein. Such an embodiment is illustrated in FIG. 13, where the components have similar functions to the components shown in FIG. 3a, with the exception of the legacy machine interface 1302, which is used to interface with the dispensing and payment processing functionality of the existing vending machine. Similarly, software implementing some or all of the features outlined herein could be sold to vending machine manufacturers to operate on generic hardware. The advantage of such an implementation is that some (although not all) of the features of the disclosed vending machine can be implemented at a lower cost and without wasting existing vending machine infrastructure.

The preceding description of the disclosure has been presented for purposes of illustration and description and is not intended to be exhaustive or to limit the disclosure to the precise form disclosed. The description was selected to best explain the principles of the present teachings and practical application of these principles to enable others skilled in the art to best utilize the disclosure in various embodiments and various modifications as are suited to the particular use contemplated. It should be recognized that the words "a" or "an" are intended to include both the singular and the plural. Conversely, any reference to plural elements shall, where appropriate, include the singular.

It is intended that the scope of the disclosure not be limited by the specification, but be defined by the claims set forth below. In addition, although narrow claims may be presented below, it should be recognized that the scope of this disclosure is much broader than presented by the claim(s). It is intended that broader claims will be submitted in one or more applications that claim the benefit of priority from this application. Insofar as the description above and the accompanying drawings disclose additional subject matter that is not within the scope of the claim or claims below, the additional disclosures are not dedicated to the public and the right to file one or more applications to claim such additional disclosures is reserved.

What is claimed is:

1. A vending machine system comprising:
   a housing;
   a plurality of storage bins disposed within the housing, each of said storage bins storing one or more food items of a particular type;
   an item dispenser disposed within the housing, the item dispenser adapted to retrieve items from the plurality of storage bins;
   a vending area;
   a processor disposed within the housing, the processor coupled to the item dispenser;
   the processor maintaining a price for each of the particular types of food items;
   a clock disposed within the housing and coupled to the processor;
   a network interface coupled to the processor, the network interface adapted to receive a calendar of high traffic events including at least one spectator attended sporting event wherein each of the high traffic events has a start time and an end time and wherein each high traffic event is an external event that is expected to drive higher demand for at least one of the one or more food items; and
   wherein the processor is adapted to raise the price of the at least one of the one or more of the particular type of food items that is expected to have higher demand for at least a portion of the time encompassed by the start time and end time of at least one of the high traffic events recited in the calendar of high traffic events.

2. The vending machine system of claim 1 further comprising a database storing an inventory of items stored in the storage bins and wherein the processor is adapted to receive an order using the network interface and reserve an item based on the order.

3. The vending machine system of claim 1 further comprising a plurality of locks, with each lock corresponding to an individual storage bin.

4. The vending machine system of claim 3 wherein each lock includes an authentication mechanism and wherein each authentication mechanism is adapted to authenticate a single vendor.

5. The vending machine system of claim 1 further comprising a food preparation module coupled to the processor wherein the item dispenser is further adapted to move an item from a particular storage bin to the food preparation module.

6. The vending machine system of claim 5 further comprising an optional ingredient storage area wherein a plurality of optional ingredients are stored and wherein the item dispenser is adapted to retrieve the item from a particular storage bin from the food preparation module and place it on a vending package along with at least one optional ingredient, and then move the vending package to the vending area.

7. The vending machine system of claim 1 wherein the price of at least one of the particular type of food items is lowered after the end time of the high traffic event.

\* \* \* \* \*